United States Patent

[11] 3,559,882

| [72] | Inventor | Howard E. Jordan |
| | | Euclid, Ohio |
| [21] | Appl. No. | 808,787 |
| [22] | Filed | Mar. 20, 1969 |
| [45] | Patented | Feb. 2, 1971 |
| [73] | Assignee | Reliance Electric Company |
| | | a corporation of Delaware |

[54] PROCESS DIGITAL CONTROL
15 Claims, 2 Drawing Figs.

[52] U.S. Cl.................................................. 236/15,
236/78, 235/151.1, 431/146.2
[51] Int. Cl..........................................................G06f 15/46,
G06s 7/66
[50] Field of Search........................................... 236/78D,
15B, (Comp. Digest); 235/151, 151.1; 340/146.2;
431/75

[56] References Cited
UNITED STATES PATENTS

| 3,086,708 | 4/1963 | Berkowitz et al............. | 235/154 |
| 3,193,820 | 7/1965 | Ernyei............................ | 235/151X |
| 3,202,800 | 8/1965 | Phillips, Sr. et al............ | 219/497 |
| 3,252,693 | 5/1966 | Nelson............................ | 235/151X |
| 3,321,608 | 5/1967 | Sterling.......................... | 235/151.1 |
| 3,391,275 | 7/1968 | Bullock et al.................. | 235/151.1 |

*Primary Examiner*—William E. Wayner
*Attorney*—Woodling, Krost, Granger & Rust

ABSTRACT: An oven is a load in a process and the control acts through a partly digital and partly analogue loop with a digital controller to control the temperature of the oven. The digital controller has a comparator with two inputs, one in the partly digital/analogue loop and the other from a set point generator which is used to change the set point and hence the temperature of the oven. This set point generator is controlled either manually or by a digital computer having a temperature-sensing feedback from the oven.

PATENTED FEB 2 1971 3,559,882

INVENTOR.
HOWARD E. JORDAN
BY Woodling, Krost,
Granger and Rust
ATTORNEYS

PROCESS DIGITAL CONTROL

BACKGROUND OF THE INVENTION

In the application of digital computers to control industrial processes the problem frequently arises to control the temperature of ovens, pressure, flow etc. The prior art utilizes two techniques for controlling such a process variable or condition of a load. In a first prior art system a computer adjusts the set point of an analogue controller by providing the set point input to the controller with an analogue signal that is proportional to the desired temperature. The set point analogue signal is provided from the computer's digital to analogue converter.

A second prior art system is a direct digital control in which the computer receives inputs from the process and generates correction signals which are passed directly to the actuator without an intervening analogue controller.

The disadvantage to this second system of direct digital control is that the direct intervention by the computer into the control loop imposes a sampling time delay between any change in the process and the time that a corrective action can be effected to the actuator. By this, it is meant the computer only samples or senses a condition of the oven load at certain repetitive intervals instead of continuously, because the computer is controlling many different functions in the entire process. This sampling time delay can result in a system with poor response or even s instability.

The first system above with an analogue controller overcomes the sampling time delay but it is subject to process disturbances due to noise entering the analogue control system. Usually the sensing signals sent back are electrical in nature and usually are a small magnitude. Accordingly electrical noise or random electrical disturbances will adversely affect the accuracy of the magnitude of the signals and these are errors which disturb the control of the process. Analogue control systems are also subject to errors due to drift with time and temperature in the characteristics of the analogue components.

Accordingly an object of the invention is to provide a process control system which overcomes the above-mentioned disadvantages.

Another object of the invention is to provide a digital process control apparatus which is not disturbed by noise and drift and which does not have any sampling time delay between any change in the process and the time that a corrective action is taken.

Another object of the invention is to provide a digital process control apparatus wherein a first continuously operable control loop is partly digital and partly analogue to provide continuous control of the load in the process and another loop includes a digital computer which periodically samples a process condition and adjusts a set point as required.

SUMMARY OF THE INVENTION

The invention may be incorporated in a process digital control apparatus comprising, in combination, a load as a part of a process, an actuator connected to control a given condition of said load, a controller having first and second inputs to a comparator and said comparator connected to control said actuator, sensor means responsive to said condition of said load, means connected to said sensor means and supplying a variable digital signal proportional to said condition of said load to one input of said controller, a set op point generator generating a set point signal, and means connecting said set point signal to the other of said inputs of said controller to thus control the set point of said condition of said load.

Other objects and a fuller understanding of the invention may be had by referring to the following description and claims, taken in conjunction with the accompanying drawing.

DESCRIPTION OF THE PREFERRED EMBODIMENT

Figure 1:
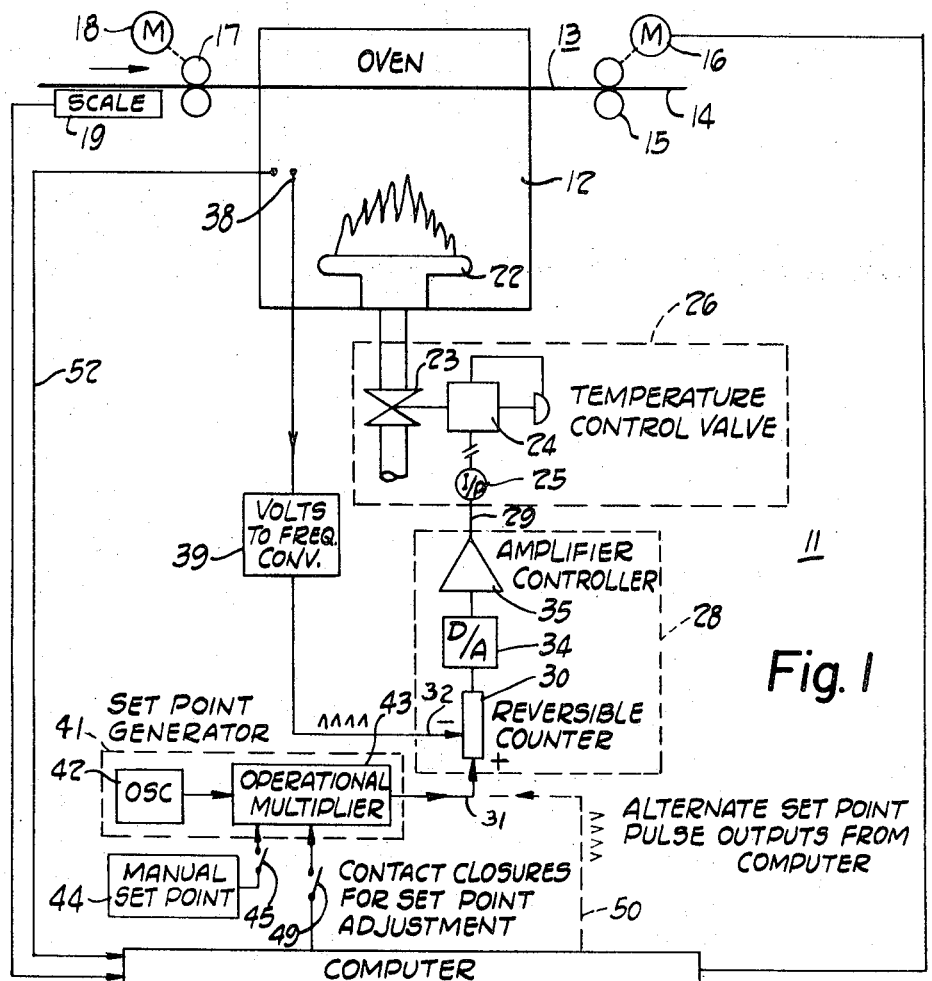
FIG. 1 is a schematic diagram of a process digital control apparatus constructed according to the invention.

FIG. 1 of the drawing illustrates a preferred embodiment of the invention of a process digital control apparatus 11 controlling a condition of a load 12 in a process 13. By way of example only, the process 13 includes the load 12 which is a heat exchanger or more particularly an industrial oven heating a web 14 as a part of the process 13. Many industrial processes include treatment of a long strip, ribbon, or web because this offers the advantage of continuous processing as distinguished from batch processing. Merely as an example, with the purpose of more clearly defining the operation of a the apparatus, this web 14 might be a tire building fabric or cord which may be elastic. This web 14 is moved through the oven 12 by exit pinch rolls 15 driven by an exit motor 16 and the tension on the web 14 within the oven 12 is controlled by the relative speed of the exit pinch rolls 15 and entrance pinch rolls 17 driven by an entrance motor 18. A scale 19 continuously weighs the web 14 to detect variations in weight as the web enters the oven 12.

The oven 12 is a heat exchanger and accordingly the temperature thereof is controlled by controlling a heat source shown as a fluid fuel burner 22. A fluid valve 23 is variable by an air motor 24 which will give smooth control of the degree of opening of this valve 23. The air motor 24 is controlled by a current to pressure converter 25 which takes a variable input magnitude of electrical current and changes it into a variable air pressure which in turn is used in the air motor 24 to control the opening of the valve 23. This air pressure may act on a diaphragm or piston, for example, for control. The elements 23, 24 and 25 make up an actuator 26 for control of the heat source 22.

A digital controller 28 controls the actuator 26 at an output 29 from the controller 28. This controller includes a comparator 30 which in this controller 28 is a reversible pulse counter. The comparator 30 has a first input 31 and a second input 32. This comparator compares digital signals on the two inputs and has an output to a digital to analogue converter 34. The error signals are passed to an amplifier 35 which amplifies the signals to a sufficient extent to supply current to the actuator 26. The reversible counter 30 counts up by one unit for each pulse received on the first input 31 and counts down by one unit for each pulse received on the second input 32. Accordingly it is only the error signal which is passed to the digital to analogue converter 34.

A partly digital and partly analogue loop is provided by sensor means 38 and a voltage to frequency converter 39 supplying a signal to the second input 32. The sensor means 38 may be a thermocouple sensing a given condition of the oven load 12; namely, temperature. This thermocouple has a small voltage output and the voltage to frequency converter 39 supplies a stream of pulses on the output at a frequency proportional to the magnitude of the voltage from the thermocouple 38. Accordingly this stream of pulses is a digital signal supplied to the second input 32.

A set point generator 41 has an output connected to the first input 31 of the comparator 30. This set point generator has a digital signal which is a stream of pulses controlling the set point and hence the temperature of the oven load 12, As an example this set point generator 41 includes an oscillator 42 to generate a stream of pulses which are passed to an operational multiplier 43. A manual set point device 44 is connected through a switch 45 to control the operational multiplier 43. This manual set point device 44 may be used especially during setup and it acts by means of switch contact closures to change the ratio of pulses in to pulses out of the operational multiplier and thus controls the repetition rate of the digital pulse signal supplied to the first input 31.

A digital computer 48 is connected through a switch 49 to the operational multiplier 43 as an alternative to the manual set point device 44 to control the repetition rate of the pulses from the generator 41. Alternatively the computer may act on a channel 50 to deliver a pulse train directly to the first input 31, the timing of the pulses on this channel 50 being established by the internal clock of the computer.

A feedback loop includes a channel 52 from the sensor means 38 which may be the same or a different thermocouple and supplies an input to the computer 48 dependent upon the temperature of the oven 12, which is the given condition to be controlled by the apparatus 11.

OPERATION

The digital control apparatus 11 controls a condition of the oven load 12 so that the temperature of the web 14 is controlled in any desired process. As an example this might be a rubberized fabric web which is supplied to the oven of varying thickness and varying capacity to stretch and become thinner as it is heated in the oven 12. The scale 19 continuously weighs the incoming web and this may be considered the process disturbance which the computer 48 controls so that the end product of the web 14 emerges from the exit pinch rolls 15 at a constant thickness of the web between preset limits yet at maximum possible line speed. The computer 48 controls three different things in order to maintain this constant web thickness: (1) the line speed, primarily determined by the exit pinch rolls 15; (2) the tension, determined by the torque of motor 18, and (3) the oven temperature, by controlling the burner valve 23 to control the temperature of the web and hence the amount of stretch. By way of example, the incoming web may have a 100 percent variation in web weight per foot and the outgoing web needs to be controlled in thickness within a tolerance of plus or minus two per cent. As an example for a rubberized fabric which will stretch, then the web will have a decreasing thickness by (1) a decreased line speed (2) an increased tension, or (3) an increased oven temperature. Of course it will also have a decreased thickness by a decreased weight per foot on the input which is the process disturbance in this example. An increase in tension will stretch the web further to decrease the thickness. A decrease in line speed through the oven will mean that the web temperature is increased and this reduces the modulus of elasticity which results in a decrease in the thickness for a given tension. Also an increase in oven temperature will reduce the modulus of elasticity to decrease the thickness. The computer 48 may control the two motors 16 and 18 as well as the oven temperature in order to arrive at a process control which maintains a maximum line speed yet retains the web thickness constant.

The sensor 38 is a thermocouple putting out a voltage signal of variable magnitude dependent on temperature. The voltage to frequency converter 39 changes this variable magnitude signal into a variable frequency of pulses supplied on input 32 of the comparator 30. The set point generator 41 generates the train of pulses for the input 31 of this comparator 30 and if these two trains of pulses are equal there is no error signal supplied to the digital to analogue converter 34 and accordingly this indicates that the temperature of the oven is satisfactory and is maintained constant. The manual set point device 44 may be used primarily during setup of the process to control the set point of the oven temperature. If the oven temperature varies from the set point, for example, if it is too high, then there will be more pulses on the input 32 than on input 31 and the reversible counter 30 will count down and this decreases the output to the actuator 26 to partly close the fluid valve 23. Accordingly the burner 22 supplies less heat and therefore this partly digital/analogue control loop maintains a continuous control of the oven temperature.

Periodically the computer 48 will sample inputs from various sources including the sensing means 38 on channel 52. This periodic sampling will depend upon the process being controlled and might be as infrequently as once an hour or as frequent as every 5 or 10 milliseconds. In many process controls sampling once a second or once a minute will be satisfactory. This feedback loop on channel 52 is used in the digital computer 48 to control any new set point as required by changing conditions such as a changed weight per foot of the web going into the oven 12. If suddenly a new web were spliced onto the old which is twice as thick as the old web, then the oven temperature would have to be increased to maintain a uniform outgoing web thickness. The computer 48 senses the increased incoming thickness from the scale 19 and acts through the partly digital/partly analogue loop 39, 32 to increase the heat from burner 22. Also the digital computer 48 would give a signal of a new set point to slow down the line speed by motor 16 and also to increase the tension on the web by increasing the torque of motor 16. All of these actions would be in the direction of maintaining a uniform outgoing web thickness in the presence of an increased incoming web thickness. All of this is much faster than a human operator can control the entire process and establishes a finished web with a minimum of scrap due to out of tolerance web thickness variations and also establishes a maximum line speed for the various conditions. It will be noted from the above that there is no sampling time delay because the first control loop 39,32 is continuously controlling the temperature through the actuator 26, and thus the prior art system of a direct digital system with its sampling time delays is completely avoided. Also in this system which utilizes digital signals both from the converter 39 and from the set point generator 41, these digital signals are not subject to error caused by drift which would affect an analogue controller. These digital signals are compared in the reversible counter 30 and it is only the error signal which is passed to the digital to analogue converter 34. The voltage to frequency converter may be any one of a number of commercially available units, for example, Vidar Corporation Model 241R with a suitably amplified input would be satisfactory. The digital to analogue converter 34 is also available commercially by a number of different manufacturers. The signals on the feedback channel 52 may be digital in nature as developed by the sensor means 38 or if they are analogue, for example, by the usual thermocouple; then a commercially available analogue to digital converter may be inserted in the feedback channel 52. The reversible counter 30 is commercially available, for example, Model BC800 made by Janus Control Division of Tyco Semiconductor Corporation. The operational multiplier 43 may be termed an operational divider by some manufacturers because in many cases it may multiply the oscillator frequency by a proper fraction to obtain an output frequency lower than the oscillator frequency. One such operational multiplier which may be used is Model 50242, manufactured by The Reliance Electric & Engineering Company. It consists of a gate and a series of five flip-flops so that pulses are gated through depending upon the ratio set by the various flip-flops. It is a binary device and from 1 to 15 pulses are passed to the input 31 for each 15 pulses received from the oscillator 42.

The digital control apparatus 11 is shown as controlling a fluid valve 23 in a continuously variable manner through means of two different feedback loops. Accordingly although it has been described in the above example that fluid fuel is passed through this valve 23 to an oven burner 22 it will be clear that this control apparatus 11 is applicable equally well to the control of pressure, flow, etc. in a process.

Figure 2:
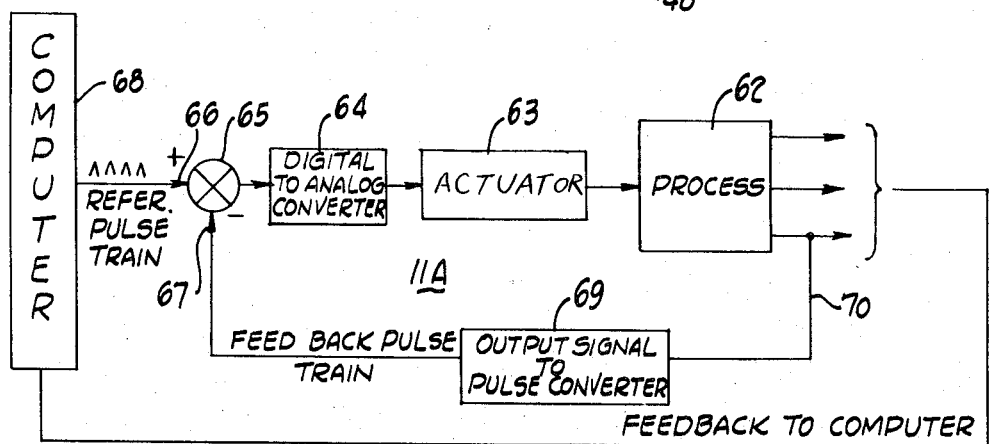
FIG. 2 is a more basic schematic diagram of the essentials of the apparatus of the invention.

FIG. 2 illustrates schematically the basic components of the digital control apparatus 11A which broadly encompasses the digital control apparatus 11 of FIG. 1. In FIG. 2 the load may be any process load 62 with some condition controlled by an actuator 63. This corresponds to the actuator 26 in the FIG. 1. A digital to analogue converter 64 supplies a signal to the actuator 63 and a comparator 65 has an output supplying the converter 64. The elements 64 and 65 may be considered together as a digital controller corresponding to the digital controller 28 of FIG. 1. This comparator 65 has a first input 66 and a second input 67. The first input 66 is derived from a digital computer 68 and the second input 67 is from a feedback loop including an analogue to digital converter 69 which senses on channel 70 a given condition of the load 62. Feedback channels 71 from one or more conditions of the process load 62 are also supplied as inputs to the computer 68. The control apparatus 11A of FIG. 2 is a general schematic diagram for the control apparatus 11 of FIG. 1. In FIG. 2 there are two feedback loops the first one 69, 70 being a partly digital/partly analogue loop which includes the comparator 65 and continuously controls a condition of the load 62 by means of the analogue controller 63. Periodically a condition of the load is sampled on the feedback channel 71 which the computer 68 uses to calculate new set points as dictated by other parts of the process.

The present disclosure includes that contained in the appended claims, as well as that of the foregoing description. Although this invention has been described in its preferred form with a certain degree of particularity, it is understood that the present disclosure of the preferred form has been made only by way of example and that numerous changes in the details of the circuit and the combination and arrangement of circuit elements may be resorted to without departing from the spirit and scope of the invention as hereinafter claimed.

I claim:

1. A process digital control apparatus comprising, in combination:
   a load as a part of a process;
   an actuator connected to control a given condition of said load;
   a controller having first and second inputs to a comparator and said comparator connected to control said actuator;
   sensor means responsive to said condition of said load;
   a computer having a digital output;
   means connected to said sensor means and supplying a variable digital signal proportional to said condition of said load to one input of said controller to complete a first control loop exclusive of said computer;
   a set point generator generating a digital set point signal;
   means connecting said set point signal to the other of said inputs of said controller to thus control the set point of said condition of said load;
   means including said computer to vary said digital set point signal; and
   a second control loop including means responsive to a condition of said process to control said computer and thus control said set point signal and said actuator.

2. Apparatus as set forth in claim 1, wherein said load is an oven, and including heating means applying heat to said oven.

3. Apparatus as set forth in claim 2, wherein said sensor means includes thermocouple means mounted to be responsive to heat inside said oven.

4. Apparatus as set forth in claim 1, wherein said load includes an oven with a fluid fuel burner.

5. Apparatus as set forth in claim 1, wherein said controller is a digital controller and has first and second inputs of digital signals.

6. Apparatus as set forth in claim 5, wherein said digital controller has an analogue output signal.

7. Apparatus as set forth in claim 1, including a valve connected to control the flow of a fluid to the load.

8. Apparatus as set forth in claim 1, wherein said comparator is a reversible counter counting up by one unit for digital input pulses on said first input and counting down by one unit for digital input pulses on said second input.

9. Apparatus as set forth in claim 8, wherein said controller includes a digital to analogue converter having an input from said reversible pulse counter and having an output connected to a current to pressure converter in said actuator.

10. Apparatus as set forth in claim 1, wherein said set point generator includes an oscillator and an operational multiplier to have a variable rate of output pulses.

11. Apparatus as set forth in claim 1, wherein said set point generator includes means to vary the repetition rate of said digital set point signal.

12. Apparatus as set forth in claim 11, wherein said means to control the repetition rate includes said computer.

13. Apparatus as set forth in claim 12, including means connecting said sensor means to said computer for adjustment of the set point in accordance with other conditions of the process.

14. Apparatus as set forth in claim 1, wherein said load is an oven, and including a fluid fuel burner supplying heat to said oven, and a valve is connected to control the flow of fluid fuel to said burner.

15. Apparatus as set forth in claim 14, wherein said actuator is a current to pressure converter, and valve controlling means to control said valve responsive to the amount of pressure supplied from said current to pressure converter.